No. 731,464. PATENTED JUNE 23, 1903.
M. O. KASSON.
FLUID CONTROLLED CLUTCH.
APPLICATION FILED MAY 12, 1902.
NO MODEL.
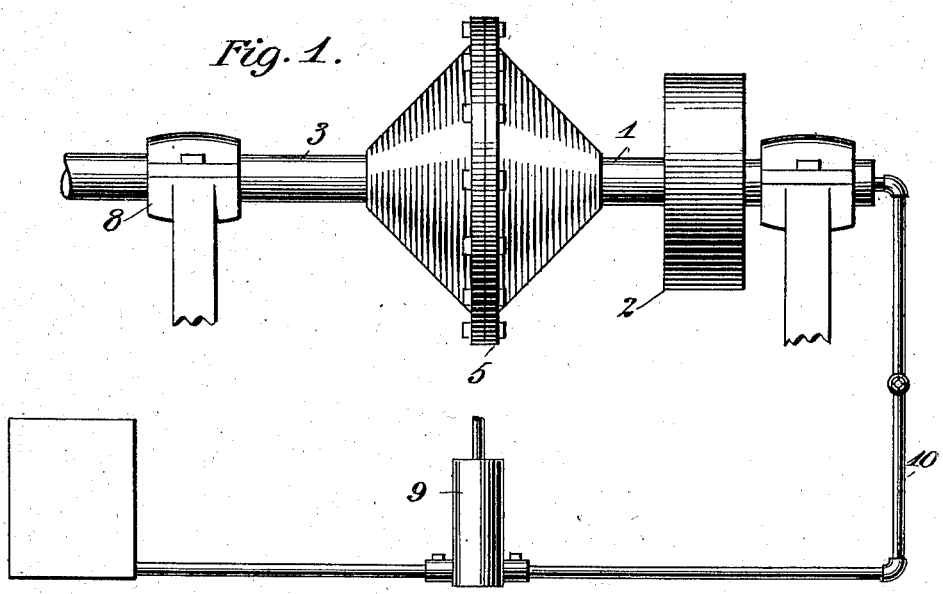
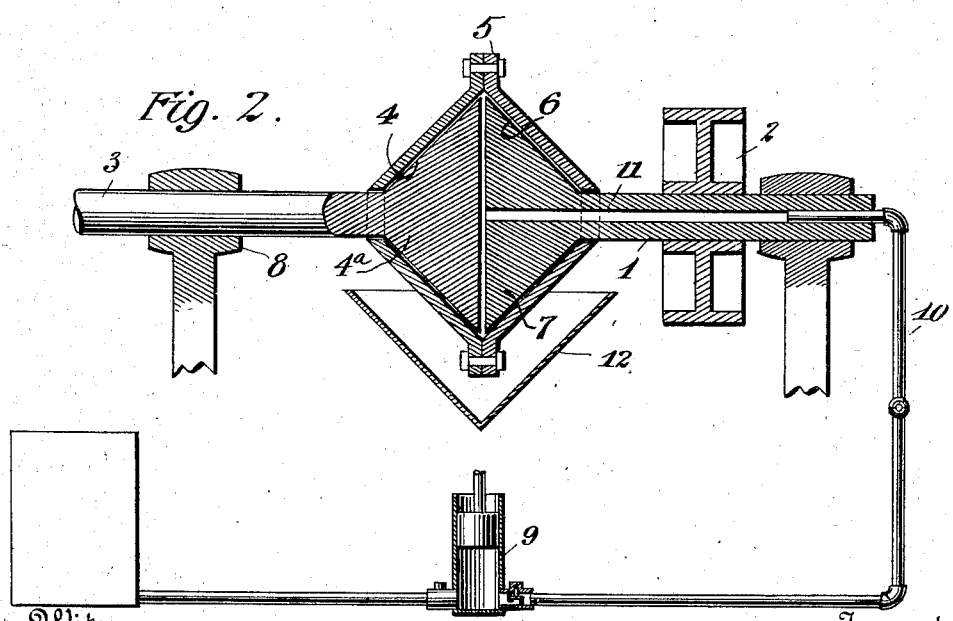
Witnesses
Frank S. Ober
T. F. Hastings
Inventor:—
Mahlon O. Kasson,
By his Attorney No. 731,464.

Patented June 23, 1903.

UNITED STATES PATENT OFFICE.

MAHLON O. KASSON, OF SANDYHILL, NEW YORK, ASSIGNOR TO UNION BAG & PAPER COMPANY, A CORPORATION OF NEW JERSEY.

FLUID-CONTROLLED CLUTCH.

SPECIFICATION forming part of Letters Patent No. 731,464, dated June 23, 1903.

Application filed May 12, 1902. Serial No. 106,920. (No model.)

*To all whom it may concern:*

Be it known that I, MAHLON O. KASSON, a citizen of the United States, residing at Sandyhill, New York, have invented certain new and useful Improvements in Fluid-Controlled Clutches, of which the following is a clear, full, and exact description.

My invention relates to a fluid-controlled clutch for connecting two rotating parts together; and my object is to improve the construction. It is particularly useful in paper-making machinery, where it is necessary that the force exerted to turn a shaft, such as in winding up a sheet of paper as it comes from the paper-making machine, shall not exceed a certain amount in order not to rupture the sheet; but I am aware that it may be used for a variety of purposes, and therefore do not limit myself to its use with paper-making machinery.

My invention will be defined in the claims.

In the drawings, Figure 1 represents a side elevation, and Fig. 2 a central vertical section, of one embodiment of my invention.

In the drawings, 1 is a driving part, such as a rotatable shaft driven by a pulley 2, which rotates a driven part 3, such as a second rotatable shaft, when the two parts are connected by the operation of the clutch. The clutch may comprise a friction-surface 4 on one of the parts, in the present embodiment a conical surface formed by a conical foot $4^a$ on the end of shaft 3 and a fluid-controlled connecting device 5 between the parts. I preferably provide a friction-surface 6 on the driving part also, and this may be a second conical foot 7, attached to shaft 1. In case I provide a friction-surface on both the driving and the driven part I prefer to have the connecting part 5 rotatable independently of both the conical portions and have so shown it, and I have provided it with a pair of conical friction-surfaces which are adapted to engage the conical surfaces 4 and 6. The casing 5 is preferably slightly movable longitudinally of its axis to engage with both cones $4^a$ and 7.

9 is one form of a device for causing a fluid-pressure within casing 5, and in this embodiment is a force-pump which forces oil or water through pipe 10 and hollow 11 in shaft 1 into the casing between the flat bases of the cones. The pressure therein will force shaft 3 to the left and bring the conical surfaces into engagement, and the casing will thus clutch both cones and transmit rotary motion from the driving-shaft 1 to driven shaft 3, and if the fluid-pressure is maintained constant only a certain amount of power can be imparted to shaft 3, for if this is exceeded cone 7 will slip around inside of casing 6, or the casing will slip around outside of cone $4^a$. The fact that there are two pairs of engaging friction-surfaces and that the casing is rotatable independently of both the driving and the driven part insures a slip between either one or other of the friction-surfaces and avoids the danger of the clutch transmitting too much power to the driven shaft. Furthermore, the fluid preferably does and in the embodiment shown can enter between the casing and the surface of the cones, and thus lubricates the same and enables the parts to slip easily on each other, but when the fluid-pressure is applied the pressure between the flat faces of the cones will move them apart and expel the intervening fluid and bring the clutch into operation, but with the certainty that if a given power is exceeded or more than a given resistance to the rotation of the driven shaft is exerted the clutch will slip and slip smoothly and without any jerk which would be liable to rupture the paper sheet. The conical shape of the friction-surfaces also provides a large extent of friction-surface.

My clutch is very delicate and accurate in its operation and is particularly valuable for use in paper-making machinery.

12 is a drip-pan which may be provided to catch the escape of fluid from the casing.

I am aware that many variations from the above construction may be made without departing from my invention as claimed, and I therefore do not limit myself to the embodiment herein illustrated and described.

What I claim is—

1. In a fluid-controlled clutch in combination, a rotatable driving part, a rotatable driven part, each of said parts having a circular friction-surface, a single connecting device between said parts rotatable independently of both said parts and having a pair of circular friction-surfaces, said connecting device being movable longitudinally of its axis, and a fluid-pressure device for moving said connecting part longitudinally, the friction-surfaces of said connecting part being adapted to engage said other friction-surfaces to clutch said driving and driven parts together.

2. In a fluid-controlled clutch in combination, a rotatable driving part, a rotatable driven part, one of said parts being movable longitudinally of its axis toward and away from the other part, a friction-surface on each of said parts, a single fluid-casing surrounding said surfaces and having friction-surfaces, said casing being rotatable independently of both said parts and movable longitudinally of its axis to cause said surfaces to engage, and means to cause a fluid-pressure within said casing to move said driving and driven parts away from each other and cause said casing to clutch both of said parts.

3. In a fluid-controlled clutch in combination, a rotatable driving part and an independently-rotatable part adapted to be driven thereby and movable longitudinally toward and from the same, each of said parts having on their adjacent ends a conical portion, said conical portions sloping away from each other, and a single casing surrounding and fitting said conical portions and rotatable independently of both said parts, and means to exert a fluid-pressure in said casing and cause said casing to clutch both of said conical portions.

4. In a fluid-controlled clutch in combination, a rotatable driving part and an independently-rotatable part adapted to be driven thereby and movable longitudinally toward and from the same, each of said parts having on their adjacent ends a conical portion, said conical portions sloping away from each other, and a single casing surrounding and fitting said conical portions and rotatable independently of both said parts, and means to maintain a fluid-pressure in said casing and cause said casing to clutch both of said conical portions, said casing permitting the entrance of said fluid between said casing and said conical parts.

5. In a fluid-controlled clutch in combination, a rotatable driving part, a rotatable driven part, each of said parts having a circular friction-surface, a hollow connecting-casing between said parts and rotatable independently of both said parts and having a plurality of circular friction-surfaces, said connecting part being movable longitudinally of its axis and adapted to engage said other friction-surfaces to clutch said parts together, and means to exert a fluid-pressure within said casing to cause said surfaces to engage each other and connect said driving and driven parts.

6. In a fluid-controlled clutch in combination, a rotatable driving part, a rotatable driven part, one of said parts being movable longitudinally of its axis toward and away from the other part, a conical portion having a flat base on each of said parts, a single fluid-casing surrounding said conical portions and having conical friction-surfaces adapted to engage therewith, said casing being rotatable independently of both said parts and movable longitudinally of its axis to cause said casing to engage said conical portions, and means to exert a fluid-pressure within said casing between the flat bases of said conical portions to move said driving and driven parts away from each other and cause said casing to clutch both of said parts.

Signed at Sandyhill, New York, this 5th day of May, 1902.

MAHLON O. KASSON.

Witnesses:
C. E. REID,
E. A. GETTEN.